United States Patent Office 3,629,180
Patented Dec. 21, 1971

3,629,180
PROCESS FOR THE PRODUCTION OF A
THERMALLY STABLE POLYMER
Naoya Yoda, Masaru Kurihara, Noriaki Dogoshi, and Ryoji Nakanishi, Kamakura-shi, Kanagawa-ken, and Hirosuke Yumoto, Masaaki Itoga, Hiroshi Mochizuki, Toshiya Yoshii, and Saburo Fujita, Ohtsu-shi, Shiga-ken, Japan, assignors to Toray Industries, Inc., Tokyo, Japan
Filed Jan. 23, 1969, Ser. No. 793,458
Claims priority, application Japan, Jan. 23, 1968, 43/3,492; May 27, 1968, 43/35,614; May 28, 1968, 43/35,696
Int. Cl. C08g 51/50
U.S. Cl. 260—30.6
4 Claims

ABSTRACT OF THE DISCLOSURE

A process for producing shapable polymeric compositions having improved mechanical properties is described which involves the heating of a polymer containing polyamide-acid recurring units in an organic polymerization solvent, which solvent also contains an amount of a phosphorous compound in the range of from about .01% by weight to about 30% by weight until imide ring closure is effected.

BACKGROUND OF THE INVENTION

(1) Field of the invention

Figure 1:
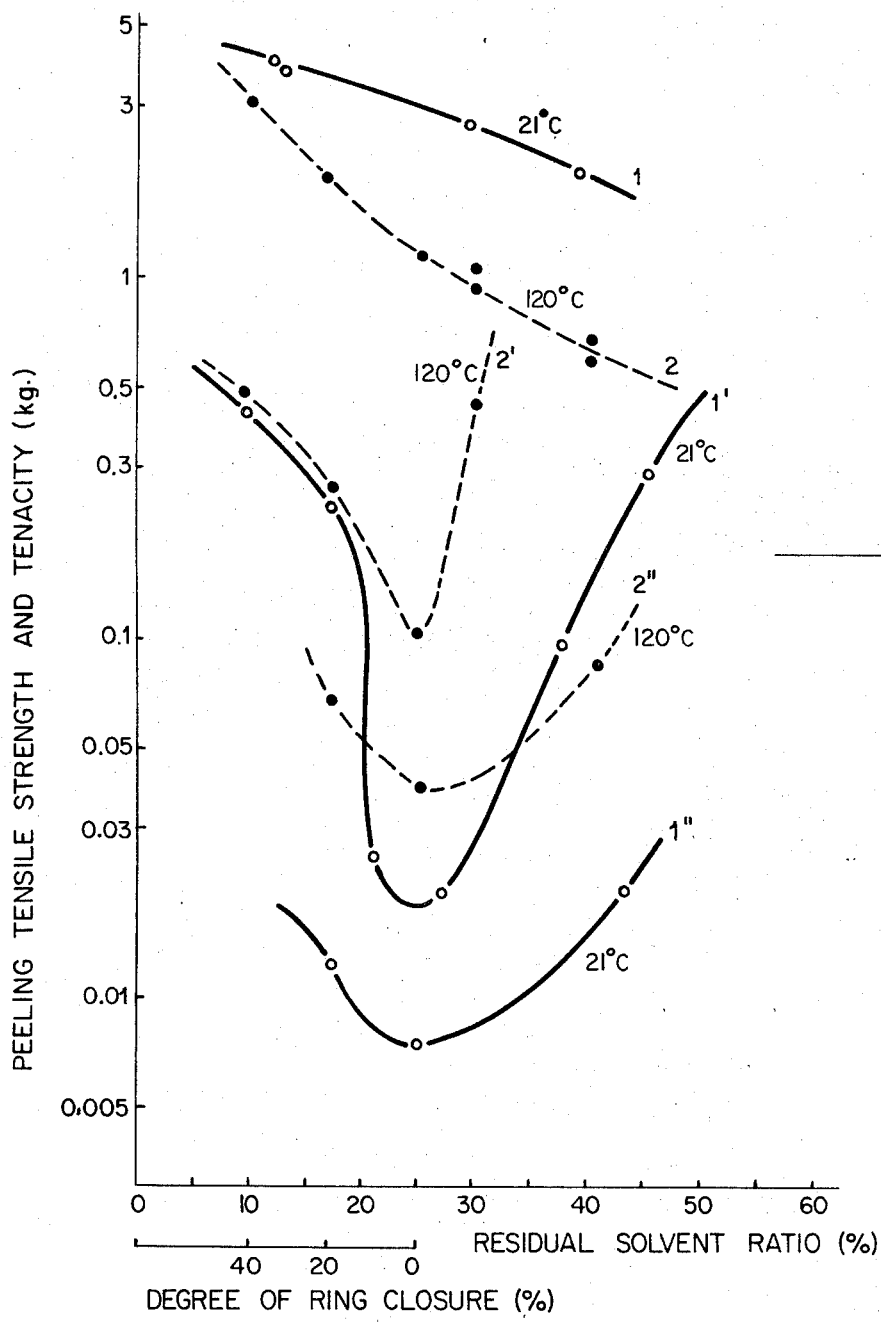

The present invention relates to improvements in a process for preparing a heat-resistant synthetic polymer containing imide ring in the amine polymer chain.

(2) Description of the prior art

It is known that when tetracarboxylic acid dianhydride is reacted with diamine and the resultant polyamide-acid is heat-treated, a polymer containing imide rings with excellent heat resistance is obtained (e.g., U.S. Pat. Nos. 3,198,093; 3,179,614; 3,179,630 and 3,179,634). However, certain technical improvements in this process and the resultant polymers are desired, such as improvement in the conditions of heat treatment of the polyamide-acid, and specifically, a lowering of the heat-treating temperature and a shortening of heating period.

It is also customary that these imide-type polymers are processed to various shaped articles by first dry shaping the polyamide-acids at the stage of prepolymers, and then converting them to imide-type polymers by heating the shaped articles. For instance, an organic solvent solution of a polyamide-acid is flowed on a smooth surface such as a metal or glass surface and heat dried, and thereafter the resultant polymer is peeled from said surface, thereby producing a self-supporting film of the polymer. The step of peeling the film from the smooth surface after heat conversion has been found to be very difficult. This is possibly due to the presence of certain polyamide-acid functional groups.

SUMMARY OF THE INVENTION

Therefore, an object of the present invention is to provide improvement in the conditions of heat treatment in the preparation of such imide-type polymers, namely, a process for lowering the heat-treating temperature (ring closing temperature).

Another object of the persent invention is to provide a process for improving the peeling property of such polymers from the smooth surface at the time of dry shaping.

Still another object of the present invention is to provide a process for the preparation of an imide-type polymer having remarkably improved heat resistance, mechanical properties, hydrolytic resistance and other properties.

The process of this invention comprises heat-treating a polyamide-acid in an organic polymerization solvent, which solvent also contains an amount of a compound selected from the group consisting of phosphoric acid, phosphorous acid, hypophosphorous acid and esters thereof in the range of from about 0.01 to about 30% by weight based on said polyamide-acid.

Typical polyamide-acids useful in accordance with the present invention have the following recurring unit:

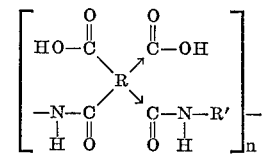

wherein ↑ denotes isomerism; wherein R is an organic tetravalent radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each being attached to separate carbon atoms of said divalent radical; and wherein n is an integer sufficient to provide a polyamide-acid having an inherent viscosity of at least 0.05, and preferably from about 0.1 to about 5.0, measured as a 0.5% solution in N-methyl pyrrolidone at 30° C.

One of the known process for preparing polyamide-acid compositions comprises reacting at least one organic diamine having the structural formula:

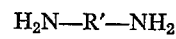

wherein R' is a divalent radical containing at least 2 carbon atoms, the two amino groups of said diamine each attached to separate carbon atoms of said divalent radical; with at least one tetracarboxylic acid dianhydride having the structural formula:

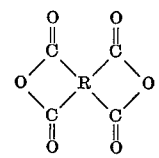

wherein R is an oragnic tetravalent radical containing at least 2 carbon atoms, no more than 2 carbonyl groups of said dianhydride being attached to any one carbon atom of said tetravalent radical; in an organic solvent for at least one reactant, said solvent being inert to the reactants, preferably under anhydrous conditions, for a time, preferably of at least about 1 minute, and at a temperature below 175° C., sufficient to provide at least 50% of the corresponding polyamide-acid.

Any process for preparing the polyamide-acid starting material may be used. Examples, without limitation, of phosphorous compounds added to the polyamide-acid, are phosphoric acid, phosphorous acid, hypophosphorous acid and esters thereof. In the case of such esters, there is no particular limit in the length of hydrocarbon chain of an ester residual group, however, a hydrocarbon ester having below 20, especially below 8 carbon atoms on a halogen or hydroxy substituent thereof is preferred. Specifically, alkyl esters such as methyl, ethyl, butyl, hexyl, heptyl, octyl, decyl, dodecyl, hexadecyl and octadecyl; aryl esters such as phenyl, tolyl and naphthyl; arylalkyl esters such as benzyl, and cycloalkyl esters such as cyclohexyl and cyclooctyl including the halogen substituents and hydroxy substituents thereof are useful in accordance with the process of this invention. With respect to the phosphorus compounds utilized, the 1-ester, 2-ester and 3-ester are equally suitable.

Specific phosphorus compounds which are useful in accordance with the process of this invention are as follows:

Phosphorous acid esters such as triphenyl phosphite, tricresyl phosphite, triethyl phosphite, phenyl (didecyl) phosphite, tridodecyl phosphite, tris (o-chlorophenyl) phospihte, diethyl phosphite, dimethyl phosphite, triisopropyl phosphite, dilauryl phosphite, triauryl phosphite, trioleyl phosphite, bis-chloropropyl phosphite, bis(2-ethylhexyl) phosphite, diallyl phosphite, diethylmethyl phosphite and phenyldiethyl phosphite; phosphoric acid esters such as triethyl phosphate, tricresyl phosphate, trinaphthyl phosphate, tris(p-chlorophenyl) phosphate, triphenyl phosphate, dilauryl phosphate, distearyl phosphate, dioleyl phosphate, trilauryl phosphate, tributoxyethyl phosphate, tri(2,4-dichlorophenyl) phosphate, dichloropropyl monochloro propyl phosphate, dimethyl phosphate, monomethyl phosphate and dimethylethyl phosphate. Hypophosphorous acid esters such as methyl hypophosphite, ethyl hypophosphite, phenyl hypophosphite, cresyl hypophosphite, lauryl hypophosphite, stearyl hypophosphite, oleyl hypophosphite, butoxyethyl hypophosphite, dimethyl hypophosphite, diethyl hypophosphite, dioleyl hypophosphite, triethyl hypophosphite, triphenyl hypophosphite, bis-chloropropyl hypophosphite and bis(2-ethylhexyl) hypophosphite.

The phosphorus compound is added to the polyamide-acid in an amount of from about 0.01 to about 30% by weight, especially preferably an amount from about 0.1 to about 10% by weight based on said polyamide-acid. It is preferable that addition of the phosphorus compound to the polyamide-acid be carried out in an organic solvent solution of the polyamide-acid. The solvent in this case is generally a solvent utilized at the time of preparation of polyamide-acid, namely, a polymerization solvent. The solvents useful in such polymerization are the organic solvents whose functional groups do not react with either of the reactants (the diamines or the dianhydride) to a greater extent than the reactants do with each other. Besides being inert to the system, the solvents are preferably a solvent for at least one of the reactants, and most preferably for both of the reactants. Moreover, the organic solvent is an organic liquid other than either reactant or homologs of the reactants that is a solvent for at least one of the reactants. Suitable solvents may contain functional groups, the functional groups being groups other than monofunctional primary and secondary amino groups and other than the monofunctional dicarboxyl-anhydro groups. Such normally liquid organic solvents as N,N-dialkylcarboxylamide are useful as solvents in the process of this invention. The preferred solvents are the lower molecular weight N,N-dialkylcarboxylamides, and particularly N,N-dimethylformamide and N,N-dimethylacetamide. These solvents may easily be removed from the polyamide-acid and/or polyamide-acid shaped articles by evaporation, displacement or diffusion. Other useful solvents of this nature are: N,N-diethylformamide, N,N-diethylacetamide, N,N-dimethylmethoxy acetamide, N-methyl caprolactam, etc. Other solvents which may be used in accordance with the process of the present invention are: dimethylsulfoxide, N-methyl-2-pyrrolidone, tetramethylene urea, pyridine, dimethylsulfone, hexamethylphosphoramide, tetramethylene sulfone, formamide, N-methylformamide and N-acetyl-2-pyrrolidone. The solvents can be used alone, in combinations of other useful solvents, or in combination with poor solvents such as benzene, benzonitrile, dioxane, butyrolactone, xylene, toluene and cyclohexane.

There is no particular limitation in the concentration of the solvent, however, a concentration of polyamide-acid of from about 0.1 to about 60% by weight is preferred, and a concentration of from about 1 to 50% by weight of the solvent is most preferred.

Useful organic diamines for preparing the polyamide-acid in accordance with this invention are characterized by the formula:

wherein R′, the divalent radical, may be selected from the following groups: aromatic, aliphatic, cycloaliphatic, combination of aromatic and aliphatic, heteroxyxlic, bridged organic radicals wherein the bridge is oxygen, nitrogen, sulfur, silicone or phosphorus, and substituted groups thereof. The most useful diamines are the primary diamines. Although secondary diamines such as piperazine may also be used to produce the polyamide-acid compositions, only the primary diamines, upon reaction with the dianhydrides, provide polyamide-acids which after shaping may be converted into the polyimides. The preferred R′ groups in the diamines are those containing at least 6 carbon atoms and characterized by benzenoid unsaturation, i.e. alternate double bonds in a ring structure. Among the specific diamines which are suitable for use in accordance with the process of the present invention are:

meta-phenylene diamine;
paraphenylene diamine;
4,4′-diaminodiphenyl propane;
4,4′-diamino-diphenyl methane;
benzidine;
4,4′-diamino-diphenyl sulfide;
4,4′-diamino-diphenyl sulfone;
3,3′-diamine-diphenyl sulfone;
4,4′-diamino-diphenyl ether;
2,6-diamino-pyridine;
bis-(4-amino-phenyl)diethyl silane;
bis-(4-amino-phenyl)phosphine oxide;
bis(4-aminophenyl)-N-methylamine;
1,5-diamino-naphthalene;
3,3′-dimethyl-4,4′-diaminobiphenyl;
3,3′-dimethoxy benzidine;
2,4-bis-(beta-amino-butyl) toluene;
bis-(para-beta-amino-t-butylphenyl)ether;
para-bis-(2-methyl-4-amino-pentyl)benzene;
para-bis(1,1-dimethyl-5-amino-pentyl)benzene;
m-xylylene diamine;
p-xlylyene diamine;
bis-(para-amino-cyclohexyl)methane;
hexamethylene diamine;
nonamethyl diamine;
decamethylene diamine;
3-methylheptamethylene diamine;
4,4-dimethylheptamethylene diamine;
2,11-diamino-docecane;
1,2-bis(3-amino-propoxy)ethane;
2,2-dimethyl propylene diamine;
3-methoxy-hexamethylene diamine;

2,5-dimethylhexa-methylene diamine;
2,5-dimethylheptamethylene diamine;
5-methylnonamethylene diamine;
1,4-diaminocyclohexane;
1,12-diamino-octadecane;
H₂N(CH₂)₃O(CH₂)₂O(CH₂)₂NH₂;
H₂N(CH₂)₂S(CH₂)₂NH₂;
H₂N(CH₂)₂N(CH₂)(CH₂)₃NH₂;

and mixtures thereof.

The class of tetracarboxylic acid dianhydrides useful in accordance with the process of this invention are characterized by the following formula:

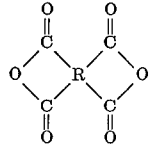

wherein R is a tetravalent organic radical selected from the group consisting of aromatic, aliphatic, cycloaliphatic, heterocyclic, combination of aromatic and aliphatic, and substituted groups thereof. However, the preferred dianhydrides are those in which the R groups have at least 6 carbon atoms characterized by benzenoid unsaturation, i.e. alternating double bonds in a ring structure, wherein the 4 carbonyl groups of the dianhydride are each attached to separate carbon atoms and wherein each pair of carbonyl groups is directly attached to adjacent carbon atoms in the R group to provide a 5-membered ring as follows:

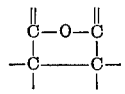

Illustrations of specific dianhydrides suitable for use in accordance with the process of the present invention include: pyromellitic dianhydride; 2,3,6,7-naphthalene tetracarboxylic dianhydride; 3,3′,4,4′-diphenyl tetracarboxylic dianhydride; 1,2,5,6-naphthalene tetracarboxylic dianhydride; 1,2,3,4-cyclopentane tetracarboxylic dianhydride; 2,2′,3,3′-diphenyl tetracarboxylic dianhydride; 2,2-bis(3,4-dicarboxyphenyl) propane dianhydride; 3,4-dicarboxyphenyl sulfone dianhydride; 2,3,4,5-pyrrolidone tetracarboxylic dianhydride; 3,4,9,10-perylene tetracarboxylic dianhydride; bis(3,4-dicarboxyphenyl) ether dianhydride; ethylene tetracarboxylic dianhydride; etc.

The process of this invention produces particularly unexpected effects when the R or R′ moieties described above include a heterocyclic ring other than an imide ring, or a group convertible to a heterocyclic ring other than an amide ring by heat-treatment. As an example, the most unexpected results produced by the process of this invention are achieved through the use of a polyamide-acid having the following general structural formula:

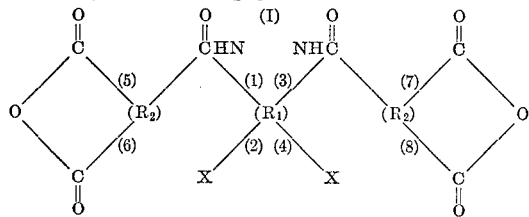

wherein R₁ is a tetravalent aromatic radical, the combination of linkages (1) and (2) are attached to adjacent carbon atoms of the aromatic nucles, as well as the combination of linkages (3) and (4), R₂ is a trivalent radical, preferably a trivalent aromatic radical having at least 3 carbon atoms, the combination of linkages (5) and (6), and the combination of linkages (7) and (8) are attached to adjacent carbon atoms, X is OR″, SR″, Cl, COOR″ or NHR″ (wherein R″ is hydrogen or hydrocarbon radical). With respect to the various cases of X at the time of heat-treatment for producing imide ring closure, OR″ or Cl produce oxazole rings, SR″ produces thiazole rings, COOR″ produces oxazinone rings and NHR″ produces imidazole rings.

In said Formula I, the case where R₁ is a compound having a tetravalent radical having 2 non-condensation-type benzene rings, e.g.

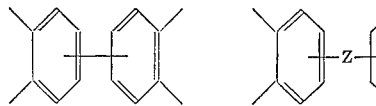

and R₂ is a compound having a trimellitic unit, e.g.

(wherein Z is —O—, —CH₂—, —C(CH₃)₂—, —NH— or —SO₂—) is especially preferred.

It is also preferable to jointly use the tetracarboxylic acid dianhydride of the Formula I and pyromellitic dianhydride in an amount of up to about 70 mol percent of the former.

It is also preferable to substitute for a part (e.g. 1–30 mol percent) of the organic diamine with a polyamine such as triamine or tetramine.

As such polyamine, normally compounds having the following structures are preferably used:

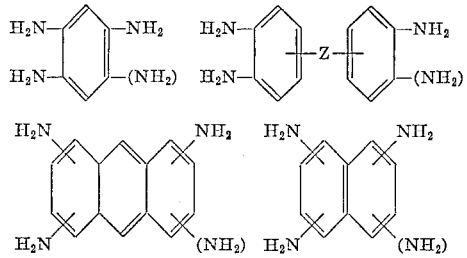

wherein Z is as defined before and —(NH₂)— indicates a triamine when absent and indicates a tetramine when present.

The polyamide-acid is, as mentioned above, obtained by mixing these amine components with the acid components at below about 175° C., preferably below about 60 C. in the desired solvent.

After shaping the composition composed predominantly of the polyamide-acid, preferably still in solvent solution, into a useful article, e.g. filament, film, tube, rod, etc., and drying the article, then in accordance with the process of this invention the polyamide-acid is converted to another polymer, thereby modifying the properties of the shaped structure. Thus, the polyamide-acid may be converted by heat treatment to the corresponding thermally stable polymer having imide rings in the polymer chain.

At this stage of heat treatment, the unexpected effects of adding a phosphorus compound in accordance with the process of this invention are developed.

Firstly, by the addition of a phosphorus compound, the heat-treating temperature (i.e., ring closing temperature) can be remarkably (e.g. by 50° C.) lowered. In addition, the heat resistance, mechanical properties and hydrolytic resistance of the produced closed-ring polymer are improved. Also the addition of a phosphorus compound enables the produced film to be easily peeled from the smooth surface upon which the polymer has been shaped.

Production of a film is carried out by flowing a polyamide-acid solution containing a phosphorus compound on a heated rotary metal drum or belt, drying the solvent and peeling the shaped film from the flowing surface.

As an example, in FIG. 1, tenacity and adhesion to a chrome plate (surface degree of roughness: 0.25) of a film of polyamide-acid (logarithmic viscosity 1.2 measured at 30° C. in a 5% solution of N-methyl-2-pyrrolidone) having the Formula I′ when ratio and temperature of the residual N,N-dimethylacetamide (solvent) are changed after the film is made and dried are shown.

The step of converting the polyamide-acid composition to a thermal stable polymer having imide rings is normally

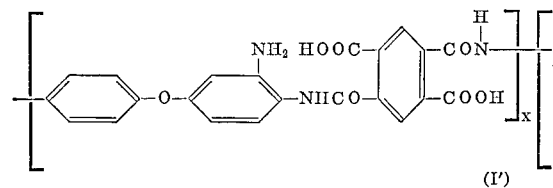

(I′)

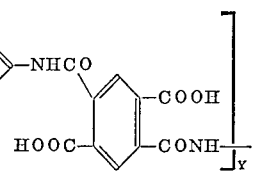

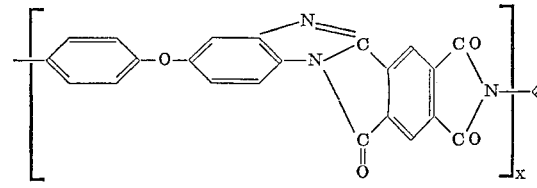

(II′)   ΣX/ΣY=5/5

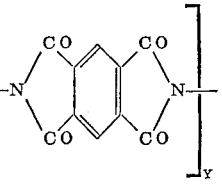

In FIG. 1, the abscissa axis show the residual solvent ration (percent) and degree of ring closure (percent) in the polymer solution, while the ordinate axis represents peeling tensile strength of the film and tenacity of the filim (kg.) Curves 1 and 2 show the relationship between the residual solvent ratio (ring closing degree) and the tenacity of the film at 21° C. and 120° C. of a 65μ thick film. Curves 1′ and 2′ show relationship between the residual solvent ratio (ring closing degree) and the peeling tensile strength at 21° C. and 120° C. in case of non-addition, while curves 1″ and 2″ show relationship between the residual solvent ratio (ring closing degree) and the peeling tensile strength at 21° C. and 120° C. in case of adding phosphorous acid in an amount of 3% based on the polymer to the polymer. Measuring is made of a sample film of 10 mm. width. In a film of which residual solvent becomes less than 25%, structure (II′) is obtained. Based on the hypothesis that the law of Beer-Lambert is established, its ring closing ratio is calculated from infrared absorption spectrum, absorbed values of 725 cm.$^{-1}$ and 1620 cm.$^{-1}$. The ring closing degree of a film heat-treated at 300° for 30 minutes is made 100%. The peeling tensile strength (peeling speed: 20 cm./min.) of a film is not affected by thickness of the film. That the peeling tensile strength in case of non-addition of an additive has minimum value in the vicinity of the residual solvent ratio of 25% is supposed to be caused by mutual action of the polyamide-acid and the chrome and when the amount of the solvent further decreases by mutual action of the ring closed structure and the chrome which affects the adhesion. Because the higher is the temperature, the more lowers the tenacity of the film and the more increases the adhesion, therefore, peeling becomes difficult. Especially in the vicinity of crossing of the tenacity of the film and the peeling tensile strength curve, the film tends to break and peeling thereof is difficult, however, because the peeling tensile strength of the film added to the polymer of phosphorous acid in an amount of 3% based on the polymer lower remarkably, even at the residual solvent ratio of 45–50% the film can be peeled sufficiently at 120° C. The adhesion will not vary regardless of thickness of the film, however, the tenacity of the film lowers as the thickness decreases. Therefore, even with the same polymer when the thickness of the film is different, the peelable critical residual solvent ratio differs. The additives according to the present invention has good compatibility with the polymer and by addition of the additive in an amount of 15% based on the polymer, transparency of the film will not be lost. To a thin film, the additive in higher concentration is added than that of the additive to a thick film in order to raise peeling property.

The polyamide-acid composition of the present invention will not be limited to such film, but exhibits remarkable effects as varnish for a coated wire, laminate, shaped article, paint and adhesive.

achieved by heat-treating said composition after removing the solvent at 180–500° C., especially preferably 200–450° C. There is no particular limit of the heat-treating period, and from 1 minute to 1 hour is preferably adopted.

Figure 2:
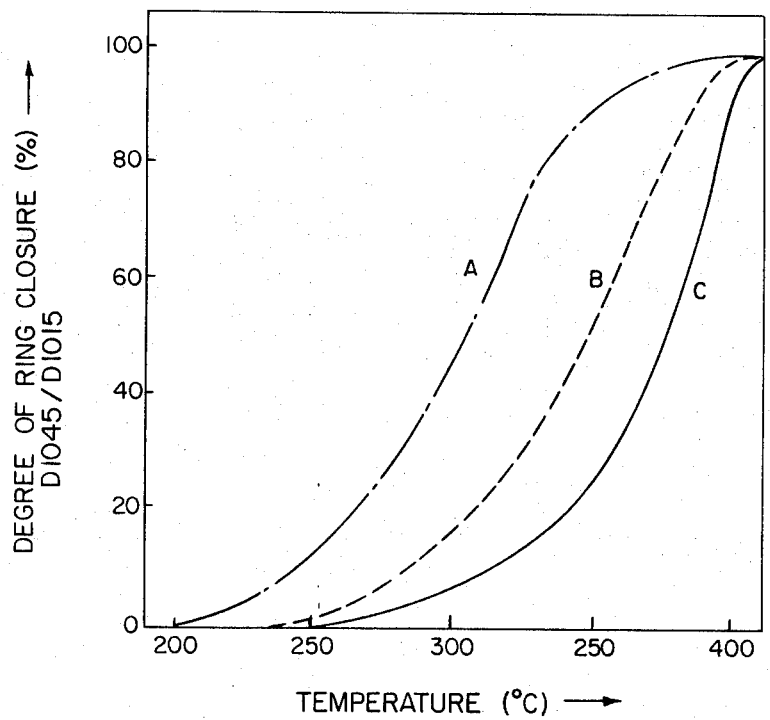

In FIG. 2 examples of lowering of ring closure temperature are shown. Namely, FIG. 2 is graph showing relationship between the ring closing temperature and the ring closure ratio in case of adding to a solution of a polymer of the structure (III), a phosphorous compound, and thereafter converting said polymer to the structure (IV) by heating.

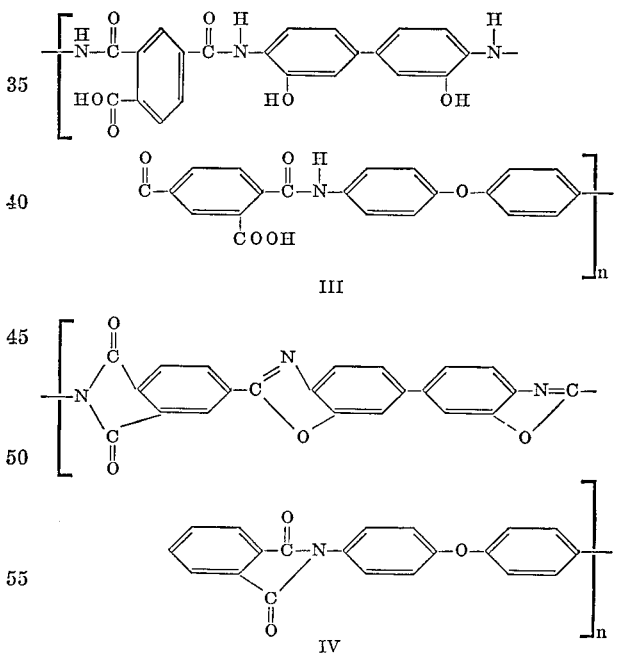

Curve A shows the result of adding 20% by weight of triphenyl phosphate. Curve B shows the result of adding 3% by weight of said phosphorus compound, and curve C shows the result of not adding a phosphorus compound. The respective polymers were heat treated for 10 minutes in nitrogen. From this graph it is understood that the addition of triphenyl phosphate, lowers the closure temperature remarkably.

EXAMPLE 1

56.4 parts of dried high-purity refined N,N′-(3,3′-dioxy-4,4′-biphenylene) bis(4-carbamoylphthalic anhydride) was dissolved in 400 parts of N-methyl pyrrolidone, and the mixed solution was stirred at 20° C. for 30 minutes. Thereafter 21.2 parts of powdery 4,4′-oxydianiline was added to this solution in one addition and polymerization was carried out in the non-uniform system. The viscosity of the polymerization system gradually rose and the reaction system became a uniform polymer solution. The logarithmic viscosity (at 30° C. in a 5% solution of concentrated sulfuric acid) of said solution was 2.39. To this polymerization system, a solution obtained by dissolving 6.6 part of triphenyl phosphate in 10 parts of N-methyl pyrrolidone was added at room temperature, the resulting solution stirred for 2 hours, eventually producing a yellow compound. The polyamide-acid phosphorus solution was flowed onto a glass plate, the flow was made uniform by a 80 doctor knife, and a film was formed at 120° C. for 20 minutes under positive air. The obtained yellow film was secured on a frame and a heat treatment was conducted at 330° C. for 15 minutes under a vacuum of 0.1 mm. Hg. The obtained film had an elongation of 75%, a ring closure ratio (as measured by the extinction brightness ratio of amide absorption of the infrared spectrum) of 95%, and as to hydrolytic resistance, the decrease in weight after boiling in an aqueous solution of caustic soda for 5 hours was 0.4%. As to bending resistance, according to JISP–8115 under conditions of 21° C. and 60% RH, the film withstood 29,000 flexings. This film did not change appearance after being heated in air at 240° C. for 16 hours. The Vickers hardness of this film was 31.2 kg./mm.[2].

EXAMPLE 1–a

The procedure of Example 1 was repeated, except that no triphenyl phosphate was added. The elongation of this film measured under the same conditions was 12%, ring closing ratio thereof was 25% and it was thus confirmed that by the addition of the phosphorus compound, the elongation and the ring closure ratio improved, and accordingly, the heat resistance, mechanical properties and hydrolytic resistance improved remarkably.

EXAMPLE 2

Into a N,N-dimethylacetamide solution (polymer concentration, 20% by weight) of a polyamide-acid having the following structural formula:

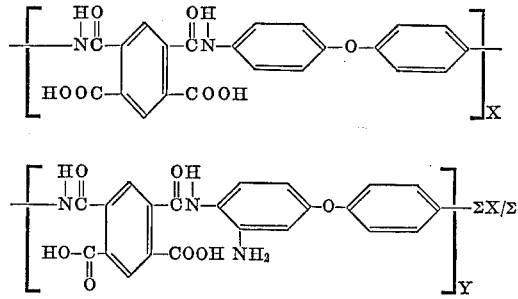

phosphorus compounds were added according to Table 1, the mixed solution was well stirred, thereafter defoamed and cast on a chromium-plated casting drum having a diameter of 1.5 m., the flow was heated and dried at 120° C. for 15 minute to obtain a 75μ-thick, which was subjected to ring closure polymerization in air at 370° C. for 5 minutes. Thereafter thermal life of each film was determined by heating in air at 400° C. until the film elongation became ½ of that before treating. Logarithmic viscosity of the film was obtained after dissolving each film in fuming nitric acid (at 70° C. for 60 minutes), and cooling at 30° C. for 20 minutes (concentration: 0.5 g./100 ml., measured at 30° C.) with the following results:

| Phosphorus compound | Amount of phosphorus compound [1] | Thermal life (minutes) at 400° C. | Logarithmic viscosity |
|---|---|---|---|
|  | 0 | 4 | 0.257 |
| Triphenyl phosphite | 9.0 | 20 | 0.308 |
| Tributyl phosphite | 2.57 | 110 | 0.382 |
| Do | 9.0 | 45 |  |
| Diphenyl phosphite | 2.26 | 25 | 0.349 |
| Pyrophosphorous acid | 0.636 | 90 |  |
| Do | 3.0 | 50 | 0.379 |
| Dimethyl phosphite | 1.06 | 90 |  |

[1] As percent by weight of polyamide-acid.

EXAMPLE 3

While an N,N-dimethyl acetamide solution of 4,4'-diamino diphenyl ether was kept at 10° C., an equimolar amount of N,N'-dimethyl acetamide pyromellitic anhydride was added thereto, and the mixture was stirred. To the obtained 10% by weight solution of polyamide-acid, pyrophosphorus acid was added in an amount of 1.2% by weight based on the polymer, the resultant mixture well mixed, and thereafter flowed onto a chromium-plated soft steel plate. The flow was dried at 100° C. for 10 minutes and thereafter was peeled at the same temperature. Experiments were conducted on a 10μ-thick film and 50μ-thick film of this product, and also on a 10μ-thick film prepared without the pyrophorous acid addition. Upon peeling the latter film tended to break, and the peeling was very difficult. Both the 10μ-thick film and 50μ-thick film prepared by pyrophosphorous acid addition could be easily peeled from the plate. No loss of transparency was observed due to the addition of pyrophosphorous acid.

EXAMPLE 4

To an N-methyl-2-pyrrolidone solution of a polyamide-acid (polymer concentration: 20%, logarithmic viscosity: 1.7 as measured at 30° C. in a 5% solution of N-methyl-2-pyrrolidone) having the following structural formula:

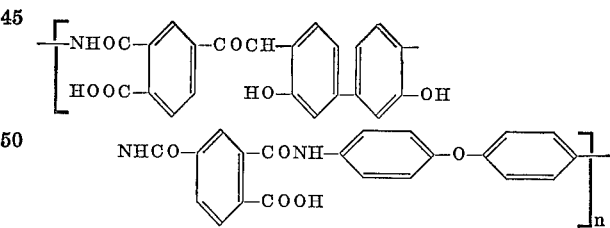

phosphoric acid in an amount of 3.5% by weight of the polyamide-acid was added, the mixture well stirred and flowed on a glass plate, dried at 128° C. for 20 minutes to obtain a 15μ-thick film. Said film could be easily peeled as it was without being cooled, however, a film produced without the addition of phosphoric acid could not be peeled well unless it was cooled.

EXAMPLE 5

To an N-methyl-2-pyrrolidone solution of 4,4-diaminodiphenyl ether kept at 5° C., an equimolar amount of pyromellitic anhydride in powdered form was added little by little and the mixture stirred for 5 hours to obtain a viscous polyamide-acid solution (8% by weight log. visc.=1.8 as measured at 30° C. in a 0.5% solution of N-methyl-2-pyrrolidone), to which tricresyl phosphite in an amount of 3% by weight based on the polymer was further added, the mixture was stirred and thereafter peeled as it was without being cooled to obtain a 6μ-thick beautiful film.

EXAMPLE 6

To an N,N-dimethylacetamide solution of a polyamide-acid (polymer concentration: 20% by weight logarithmic viscosity: 1.3 as measured in a 0.5% solution of N-methyl-2-pyrrolidone) having the following structural formula:

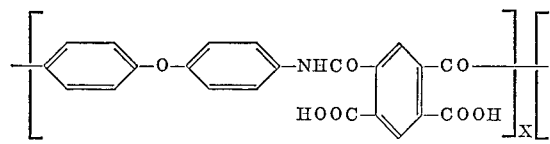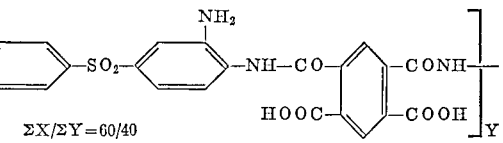

$$\Sigma X/\Sigma Y = 60/40$$

triethyl phosphate was added in an amount of 2% by weight based on the polymer, the mixture stirred and flowed on a stainless steel 27 plate (degree of surface roughness: 0.85), dried at 120° C. (residual solvent ratio: 40%) to obtain a 60μ-thick film and a 10μ-thick film. The two films could be easily peeled at 100° C. However, in the case where triethyl phosphite was not added the 10μ-thick film tended to break.

In Examples 7–28 the procedure of Example 1 was repeated, except for changing the starting materials, the results being as follows:

| Example | Tetracarboxylic acid anhydride | Amines | Produced polyamide-acid Yield [a] | Logarithmic viscosity [b] |
|---|---|---|---|---|
| 7 | N,N'(3,3'-dimethoxy-4,4'-biphenylene)bis(4-carbamoylphthalic anhydride) (59.3 parts). | Benzidine (18.4 parts). | 100 | 2.35 |
| 8 | N,N'-(3,3'-dioxy-4,4'-biphenylene)bis(4-carbamoylpthalic anhydride) (56.4 parts). | 4,4'-oxydianiline (10.0 parts), 3,4,4'-biphenyl triamine (11.5 parts). | 99 | 2.91 |
| 9 | N,N'-(3,3'-diphenoxy-4,4'-biphenylene)bis(4-carbamoylphthalic anydride) (80.4 parts). | 4,4'-oxydianiline (10.0 parts), 4,4'-oxybis(O-phenylenediamine) (10.8 parts). | 100 | 1.85 |
| 10 | N,N'-(3,3'-diphenoxy-4,4'-biphenylene)bis(4-carbamoylphthalic anhydride) (40.2 parts). | 4,4'-oxydianiline (10.0 parts), 4-(4-aminophenoxy)-o-phenylenediamine (11.5 parts). | 100 | 1.65 |
| 11 | N,N'-(3,3'-bis(phenylthio)-4,4'-biphenylene)bis(4-carbamoylphthalic anhydride) (59.6 parts). | Benzidine (9.2 parts), 3,4,4'-biphenyl triamine (9.9 parts). | 96 | 2.14 |
| 12 | N,N'-(3,3'-dimethoxy-4,4'-biphenylene)bis(4-carbamoylphthalic anhydride) (59.6 parts). | Benzidine (9.2 parts), 3,4,4'-biphenyl triamine (9.9 parts). | 98 | 1.95 |
| 13 | N,N'-(3,3'-diethoxy-4,4'-biphenylene)bis(4-carbamoylphthalic anhydride) (61.0 parts). | 4,4'-oxydianiline (10.0 parts), 4,4'-oxybis(O-phenylenediamine) (10.8 parts). | 100 | 1.85 |
| 14 | N,N'-(3,3'-dimethoxy-4,4'-biphenylene)bis(4-carbamoylphthalic anhydride) (59.6 parts). | Benzidine (6.1 parts), 3,4,4'-biphenyl triamine (6.6 parts), 3,4,3',4'-biphenyl tetramine (7.1 parts). | 100 | 2.02 |
| 15 | 4,4'-oxybis N-2-(methylamino)-p-phenylene carbamoyl diphthalic anhydride (60.6 parts). | 1,5-naphthalene diamine (16.0 parts). | 98 | 2.25 |
| 16 | 4,4'-iminobis N-(2-oxy-p-phenylene)carbamoyl diphthalic anhydride (57.9 parts). | 2,7-anthracene diamine (22.0 parts). | 100 | 2.38 |
| 17 | 4,4'-thiobis N-(2-mercapto-p-phenylene) carbamoyl diphthalic anhydride (63.0 parts). | Benzidine (18.4 parts). | 96 | 1.85 |
| 18 | 3,3'-dioxy-4,4'-bis(3,4-oxydicarbonyl benzamide) benzantilide (60.7 parts). | 4,4'-oxydianiline (20.0 parts). | 98 | 1.45 |
| 19 | 4,4'-N,N'-3,3'-(methylamino)-4,4'-biphenylene dicarbamoyl diphthalic anhydride (59.0 parts). | Benzidine (18.4 parts). | 97 | 1.89 |
| 20 | N,N'-3,3'-bis(methyl thio)-4,4'-biphenylene bis(4-carbamoyl phthalic anhydride), (15.7 parts), pyromellitic anhydride (10.9 parts). | 4,4'-oxydianiline (10.0 parts), 4-(4-amino phenoxy)-o-phenylene diamine (11.5 parts). | 99 | 3.5 |
| 21 | N,N'-(3,3'-diamino-4,4'-bisphenylene) bis(4-carbamoyl phthalic anhydride) (56.2 parts). | Benzidine (9.2 parts), 3,4,4'-biphenyl triamine (10.8 parts). | 100 | 2.91 |
| 22 | (3,3'-dimercapto-4,4'-biphenylene) bis (4-carbamoyl-phthalic anhydride) (59.6 parts). | 4,4'-oxydianiline (10.0 parts), 4,4'-oxybis (o-phenylene diamine) (10.8 parts). | 98 | 3.11 |
| 23 | (3,3'-dimercapto-4,4'-biphenylene) bis (4-carbamoyl-phthalic anhydride) (29.8 parts) pyromellitic dianhydride (10.9 parts). | Benzidine (6.1 parts), 3,4,5'-biphenyl triamine (6.6 parts), 3,4,3',4'-biphenyl tetramine (7.1 parts). | 100 | 1.55 |
| 24 | N,N'-(3,3'-diamino-4,4'-biphenylene) bis(4-carbamoyl phthalic anhydride) (28.1 parts), pyromellitic dianhydride (10.9 parts). | Benzidine (9.2 parts), 3,4,4'-biphenyl triamine (9.9 parts). | 99 | 2.46 |
| 25 | 2,2'-bis(3,4-oxydicarbonylbenzamide)-5,5'-methyl bis-benzoate (32.5 parts), pyromellitic dianhydride (10.9 parts). | Benzidine (9.2 parts), 3,4,4'-biphenyl triamine (9.9 parts). | 100 | 1.98 |
| 26 | N,N-(3,3'-dioxy-4,4'-biphenylene) bis(4-carbamoyl phthalic anhydride) (56.4 parts). | 4,4'-methylene dianiline (8.9 parts), 3,4,3',4'-biphenyl tetramine (10.7 parts). | 99 | 2.35 |
| 27 | 2,2'-bis(3,4-oxydicarbonylbenzamide)-5,5'-phenyl bis-benzoate (80.4 parts). | 4,4'-oxydianiline (10.0 parts), 3,4,4'-biphenyl tetramine (9.9 parts). | 100 | 2.38 |

| Example | Organic phosphorus compound, percent by wt. of polyamide-acid | Polymerization solvent | Reaction conditions Temp. (° C.) | Time (min.) | Atmosphere | Elongation (percent) | Film properties, ring closing ratio (%) [c] |
|---|---|---|---|---|---|---|---|
| 7 | Triphenyl phosphite, 2.5 | NMP | 300 | 10 | N₂ | 60 | 85 |
| 8 | Triethyl phosphite, 12.5 | DMAc | 310 | 15 | N₂ | 50 | 89 |
| 9 | Tributyl phosphite, 20.0 | DMF | 350 | 5 | Vacuum | 45 | 92 |
| 10 | Diethyl ethyl hypophosphite, 5.0 | DMSO | 320 | 20 | Air | 40 | 90 |
| 11 | Diphenyl phenyl phosphite, 3.5 | NMP | 309 | 5 | N₂ | 45 | 88 |
| 12 | Dicresyl phenyl p osphite, 12.0 | DMAc | 290 | 25 | Vacuum | 55 | 95 |
| 13 | Triphenyl phosphite, 2.8 | DMAc | 350 | 3 | N₂ | 65 | 100 |
| 14 | Triethyl phosphate, 13.0 | NMP | 390 | 3 | Air | 35 | 100 |
| 15 | Phenyldidecyl phosphite, 2.5 | NMP | 350 | 5 | Air | 25 | 86 |
| 16 | Trinaphthyl phosphite, 1.3 | DMAc | 320 | 5 | N₂ | 12 | 85 |
| 17 | Tris(4-octylphenyl) phosphite, 1.2 | NMP | 390 | 10 | N₂ | 45 | 98 |
| 18 | Diethyl bis (2-oxyethyl) amino methylphosphite, 3.5 | DMAc | 330 | 10 | N₂ | 35 | 85 |
| 19 | Triphenyl phosphite, 5.0 | HMPP | 310 | 10 | Air | 40 | 80 |
| 20 | Tris(o-chloro phenyl) phosphate, 4.0 | DMAc | 400 | 3 | N₂ | 40 | 100 |
| 21 | Triethyl phosphite, 10.0 | NMP | 380 | 3 | N₂ | 55 | 100 |
| 22 | Tricresyl phosphite, 20.0 | DMF | 310 | 10 | N₂ | 55 | 100 |
| 23 | Triphenyl phosphite, 0.3 | DMSO | 290 | 5 | Air | 60 | 100 |
| 24 | Tris(o-chloro phenyl) phosphite, 5.0 | NMP | 300 | 10 | Vacuum | 45 | 100 |
| 25 | Trimethyl phosphite, 8.0 | DMAc | 320 | 20 | do | 80 | 95 |
| 26 | Triphenyl-phosphite, 0.4 | DMAc | 345 | 25 | do | 75 | 90 |
| 27 | Tricresyl phosphite, 11.5 | NMP | 360 | 10 | N₂ | 50 | 85 |

[a] Yield of the polymer obtained by throwing the acid in methanol.
[b] Measured at 250° C. in a 0.5% concentrated sulfuric acid:
NMP: N-methylpyrrolidone,
DMAc: dimethyl acetamide,
DMF: dimethyl formamide,
DMSO: dimethyl sulfoxide,
HMPP: hexamethylphosphoramide.
[c] Value measured from extinction brightness ratio, 1,650 cm.⁻¹/1,500 cm.⁻¹ and 1,500 cm.⁻¹/1,500 cm.⁻¹ of amide absorption belt of infrared spectrum.

Except for changes in the starting materials, Examples 28–41 were conducted in accordance with the procedure of Example 1, the results of measuring ring closing temperature decrease, peel strength and thermal life were as follows:

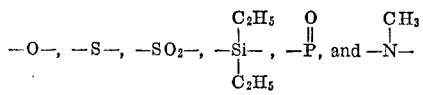

wherein R' contains a total of 4–20 carbon atoms and (b) a mixture of said diamine with 1–30 mol. percent of

| Example | Tetracarboxylic acid anhydride, tricarboxylic acid anhydride | Amines | Produced polyamide-acid Yield [a] | Logarithmic viscosity [b] |
|---|---|---|---|---|
| 28 | Pyromellitic anhydride (21.8 parts) | 4,4'-oxydianiline (20.0 parts) | 98 | 1.50 |
| 29 | do | do | 97 | 1.45 |
| 30 | do | 4,4-methylene bis-aniline (19.8 parts) | 95 | 1.85 |
| 31 | Benzaphenone tetracarboxylic anhydride (32.2 parts) | 4,4'-oxydianiline (20.0 parts) | 96 | 2.0 |
| 32 | Pyromellitic anhydride (21.8 parts) | 4,4'-methylene bis-aniline (19.8 parts) | 95 | 1.55 |
| 33 | do | 3,4,4'-diphenyl ethertriamine (10.0 parts) | 93 | 2.55 |
| 34 | do | 3,4,4'-diphenyl ethertriamine (10.8 parts), 4,4'-oxydianiline (10.0 parts) | 95 | 3.21 |
| 35 | N,N'-(3,3'-dioxy-4,4'-biphenylene)bis(4-carbonylphthalic anhydride (28.2 parts), pyromellitic anhydride (10.9 parts) | 4,4'-oxydianiline (10.0 parts), 3,4,4'-diphenyl ethertriamine (10.8 parts) | 92 | 1.88 |
| 36 | Pyromellitic anhydride (21.8 parts) | 5,5'-bis(2-p-aminophenyl benzoxazole (39.8 parts) | 96 | 1.20 |
| 37 | do | 2,2'-m-phenlyene bis(5-amino benzoxazole) (34.6 parts) | 98 | 1.39 |
| 38 | 4-chloroformyl phthalic anhydride (21.0 parts) | 3,3'-diamino-4,4'-dihydroxy diphenyl isopropyl (12.9 parts), 4,4'-oxydianiline (20.0 parts) | 95 | 1.75 |
| 39 | do | 4,4'-oxydianiline (10 parts), 3,3'-diamino-4,4'-dihydroxydiphenyl ether (10.6 parts) | 98 | 1.95 |
| 40 | do | 4,4'-oxydianiline (20.0 parts) | 92 | 2.18 |
| 41 | Pyromellitic anhydride (21.8 parts) | 4,4'-methylene bis-diisocyanate (25.2 parts) | 96 | 2.20 |

| Example | Organic phosphorus compound, percent by weight of polyamide-acid | Amount of lowering of ring closing temperature (° C.) | Peel strength (kg./cm.²) 25° C.[c] | Thermal life (min.)[d] |
|---|---|---|---|---|
| 28 | Pyrophosphorous acid, 1.2 | 20 | 0.00075 | 90 |
| 29 | | | 0.012 | 5 |
| 30 | | | 0.020 | 5 |
| 31 | Pyrophosphorous acid, 0.9 | 10 | 0.0050 | 70 |
| 32 | Phosphoric acid, 2.0 | 15 | 0.0065 | 60 |
| 33 | Pyrophosphoric acid, 3.0 | 20 | 0.0065 | 35 |
| 34 | Tricresyl phosphate, 3 | 10 | 0.0075 | 25 |
| 35 | Dimethyl phosphoric acid, 5 | 18 | 0.0031 | 100 |
| 36 | Methyl phosphite, 6 | 15 | 0.0021 | 60 |
| 37 | Dimethyl phosphite, 3 | 30 | 0.0066 | 50 |
| 38 | Diphenyl phosphite, 5 | 80 | 0.0021 | 110 |
| 39 | Pyrophosphorous acid, 3 | 60 | 0.0081 | 80 |
| 40 | Triphenyl phosphite, 4.0 | 10 | 0.0045 | 60 |
| 41 | Phosphorous acid, 5.0 | 15 | 0.0035 | 45 |

[a] Yield of the polymer obtained by recrystalling from methanol.
[b] Measured at 25.0° C. in a 0.5% solution of concentrated sulfuric acid.
[c] Adhesion (kg./cm.) between the polymer film and the chromium surface on a chrome-plated stainless steel plate was measured at a residual solvent ratio of 25%.
[d] The ring closed film was heat-treated in air at 400° C. and the period of time for the film length to become ½ of the length before heating was expressed as thermal life at 400° C.

Having thus described our invention, we claim:

1. The thermally stable polymer composition comprised of (A) the reaction product of the condensation and subsequent cyclization of (1) a tetracarboxylic acid dianhydride of the formula

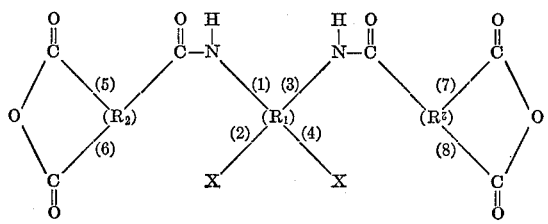

wherein $R_1$ is a tetravalent aromatic radical, $R_2$ is a trivalent radical having at least 3 carbon atoms, X is a radical selected from the group consisting of —OR', Cl, —SR', —COOR' and —NHR', the combination of linkages (1) and (2), (3) and (4), (5) and (6), and (7) and (8) are attached to adjacent carbon atoms, respectively, and R' is a radical selected from the group consisting of hydrogen and a monovalent hydrocarbon radical and (2) an amine selected from the group consisting of (a) an organic diamine of the formula $$NH_2—R'—NH_2$$

wherein R' is a member selected from the group consisting of aromatic, aliphatic, cycloaliphatic, aliphatic, aromatic radicals and combinations thereof linked together through a divalent radical selected from the group consisting of

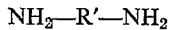

an organic polyamine selected from the group consisting of

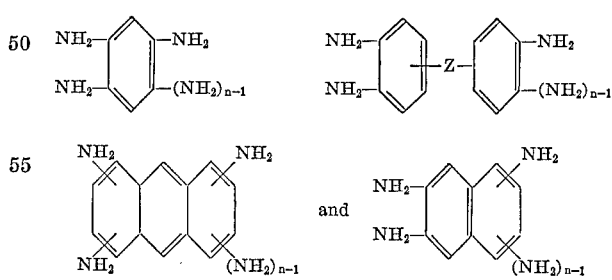

wherein Z has the meaning assigned above and $n$ is a whole number from 1–2; and (B) 0.1–30% by weight, based on the weight of the polyamide acid obtained by said condensation, of a phosphorus compound selected from the group consisting of phosphoric acid, phosphorous acid, pyrophosphorous acid and esters thereof containing up to 20 carbon atoms.

2. The process for the manufacture of the polymer composition according to claim 1 comprising the steps of condensing said tetradicarboxylic acid dianhydride with said amine at a temperature below 175° C. whereby a polyamide acid is obtained and thereafter heating said polyamide acid and 0.1–30% by weight of said polyamide acid of a phosphorus compound selected from the group consisting of a phosphoric acid, phosphorous acid, pyrophosphorous acid and esters thereof containing up to 20 carbon atoms together in a polymerization solvent until said polyamide acid cyclizes to provide said polymer composition.

3. A process according to claim 2 wherein the heating is carried out at a temperature within the range of from about 180° C. to about 500° C.

4. A process according to claim 2, wherein the polyamide-acid phosphorus compound solvent solution is cast on a metal surface and partially dried to produce a film, and thereafter heat-treating said film.

References Cited

UNITED STATES PATENTS

| 3,179,614 | 4/1965 | Edwards | 260—30.2 |
| 3,450,678 | 6/1967 | Rogers | 260—78 |

MORRIS LIEBMAN, Primary Examiner

R. ZAITLEN, Assistant Examiner

U.S. Cl. X.R.

260—32.6 N, 78 TF